(12) United States Patent
Fennell

(10) Patent No.: US 8,061,942 B2
(45) Date of Patent: Nov. 22, 2011

(54) TRAILER FOR HAULING TYRES

(76) Inventor: Brett Guy Fennell, Hillarys (AU)

( * ) Notice: Subject to any disclaimer, the term of this patent is extended or adjusted under 35 U.S.C. 154(b) by 75 days.

(21) Appl. No.: 12/204,477

(22) Filed: Sep. 4, 2008

(65) Prior Publication Data

US 2009/0058041 A1    Mar. 5, 2009

(30) Foreign Application Priority Data

Sep. 4, 2007  (AU) ................. 2007904801

(51) Int. Cl.
*B60P 7/12*    (2006.01)
(52) U.S. Cl. ........................................... 410/47
(58) Field of Classification Search .......... 410/47, 410/49, 31, 36, 37, 42, 43, 46, 77, 78
See application file for complete search history.

(56) References Cited

U.S. PATENT DOCUMENTS

| | | | | |
|---|---|---|---|---|
| 1,405,504 A * | 2/1922 | Doering et al. | ................. | 211/24 |
| 2,464,021 A * | 3/1949 | Bryant | ........................... | 410/30 |
| RE29,455 E * | 10/1977 | Slayton | ........................ | 280/786 |
| 4,175,666 A * | 11/1979 | Smith | ........................ | 211/85.18 |
| 4,395,052 A * | 7/1983 | Rash | ............................. | 280/837 |
| 4,580,843 A * | 4/1986 | Lund | ............................. | 298/18 |
| 4,732,528 A * | 3/1988 | Good | ........................... | 414/802 |
| 4,784,546 A * | 11/1988 | Johnson | ......................... | 410/49 |
| 5,048,885 A * | 9/1991 | Bomar | ............................. | 296/6 |
| 5,336,027 A * | 8/1994 | Paddock | ......................... | 410/49 |
| 5,401,129 A * | 3/1995 | Eatinger | ......................... | 410/49 |
| 5,425,608 A * | 6/1995 | Reitnouer | ..................... | 410/49 |
| 5,577,619 A * | 11/1996 | Callahan | ..................... | 211/13.1 |
| 5,954,465 A * | 9/1999 | Ellerbush | ........................ | 410/49 |
| 6,113,326 A * | 9/2000 | Nicholson | ....................... | 410/30 |
| 6,190,100 B1 * | 2/2001 | Mawji | ............................ | 410/49 |
| 6,231,284 B1 * | 5/2001 | Kordel | ............................ | 410/49 |
| RE37,575 E * | 3/2002 | Lambert | ....................... | 206/597 |
| 6,536,612 B2 * | 3/2003 | Flores | ........................ | 211/85.22 |
| 6,896,457 B2 * | 5/2005 | Halliar | ............................ | 410/77 |
| RE41,261 E * | 4/2010 | Forbes et al. | ................. | 105/355 |
| 2005/0226697 A1 * | 10/2005 | Rediehs | ......................... | 410/49 |
| 2008/0253854 A1 * | 10/2008 | Anderson | ....................... | 410/49 |
| 2009/0129884 A1 * | 5/2009 | Anderson | ....................... | 410/49 |

* cited by examiner

*Primary Examiner* — H Gutman
(74) *Attorney, Agent, or Firm* — Blank Rome LLP

(57) ABSTRACT

There is provided a trailer 10 for hauling tires 200 comprising a base frame 12 having a front end 14 and a rear end 16 and one or more wells 20 between the front end and the rear end configured to support the tires in an upstanding position. Each well comprises a tire stillage 30 against which one or more adjacent upstanding tires are supported.

14 Claims, 6 Drawing Sheets

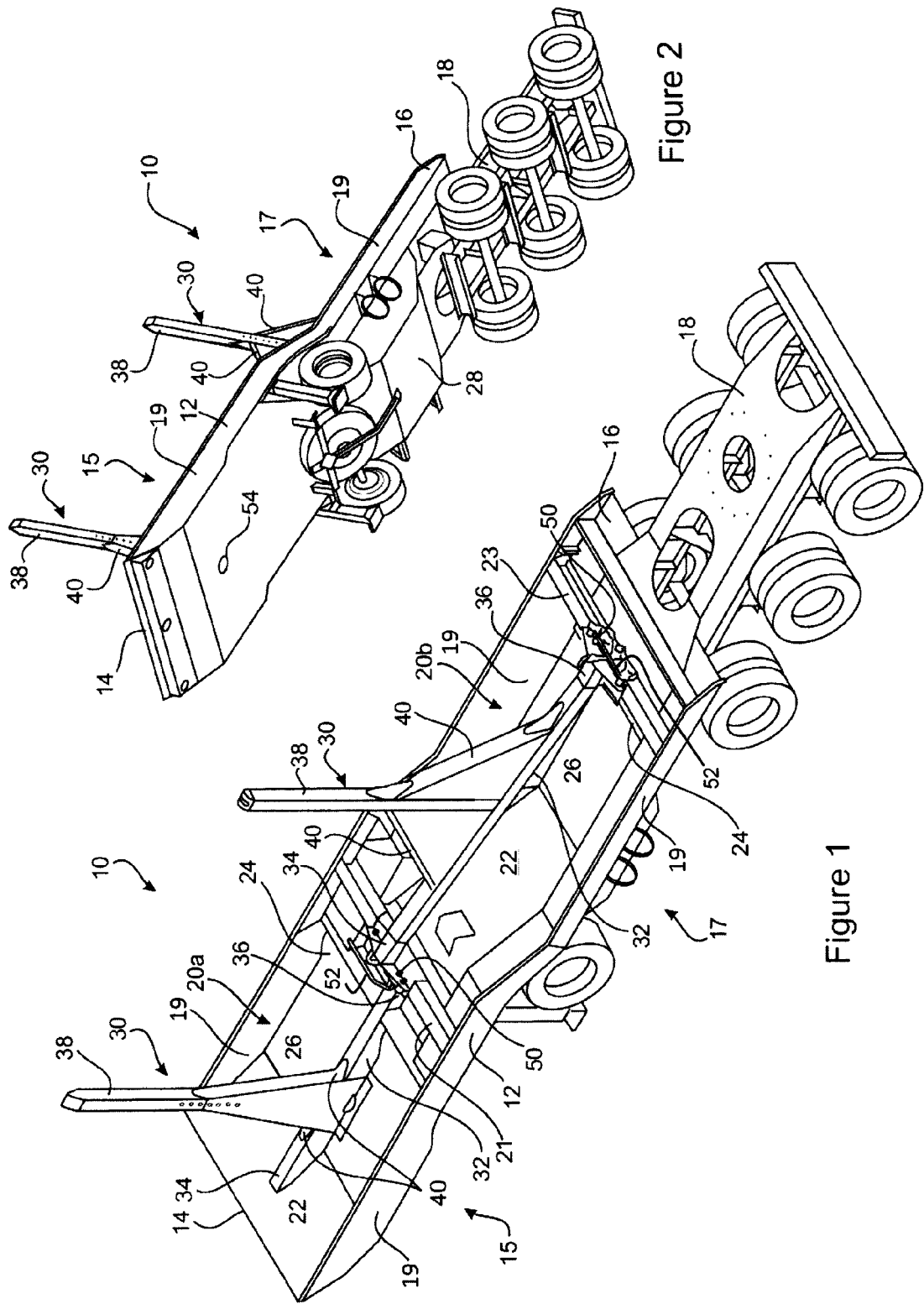

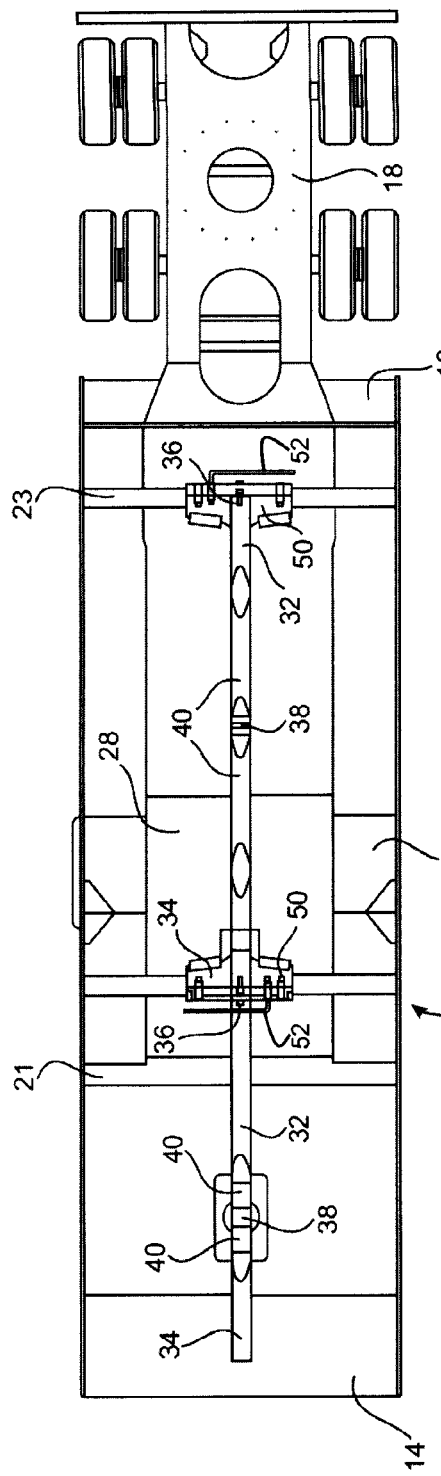
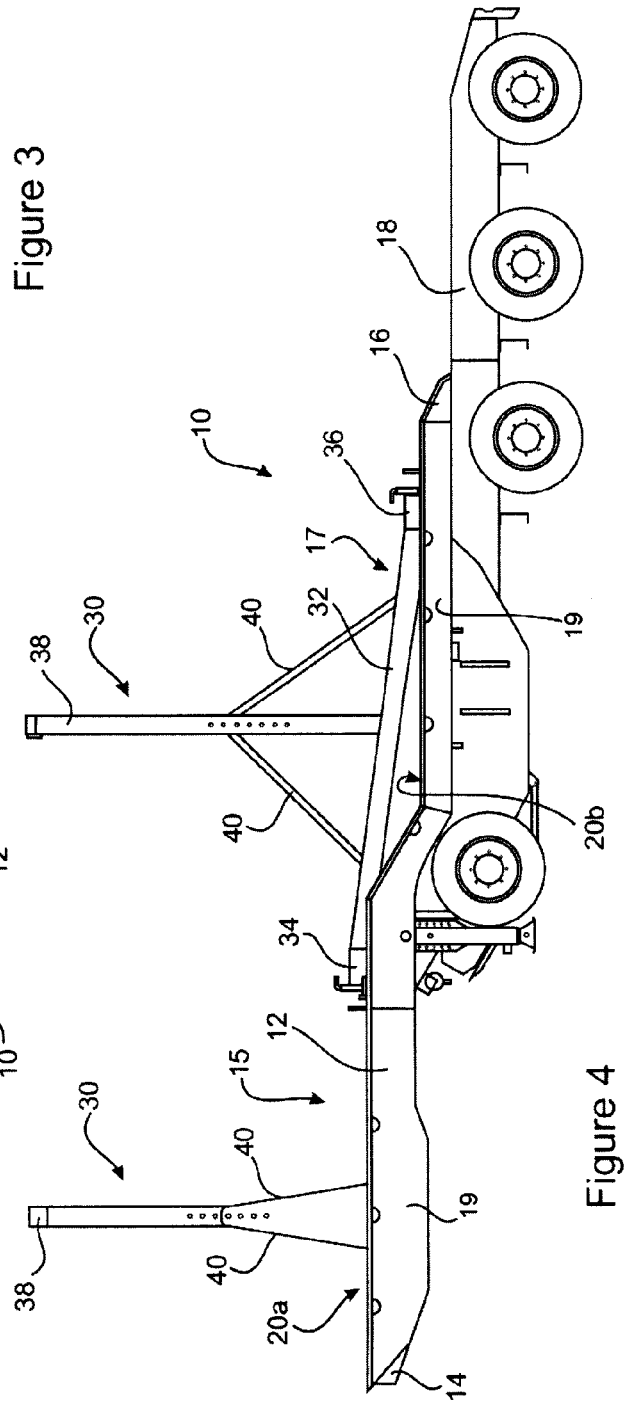

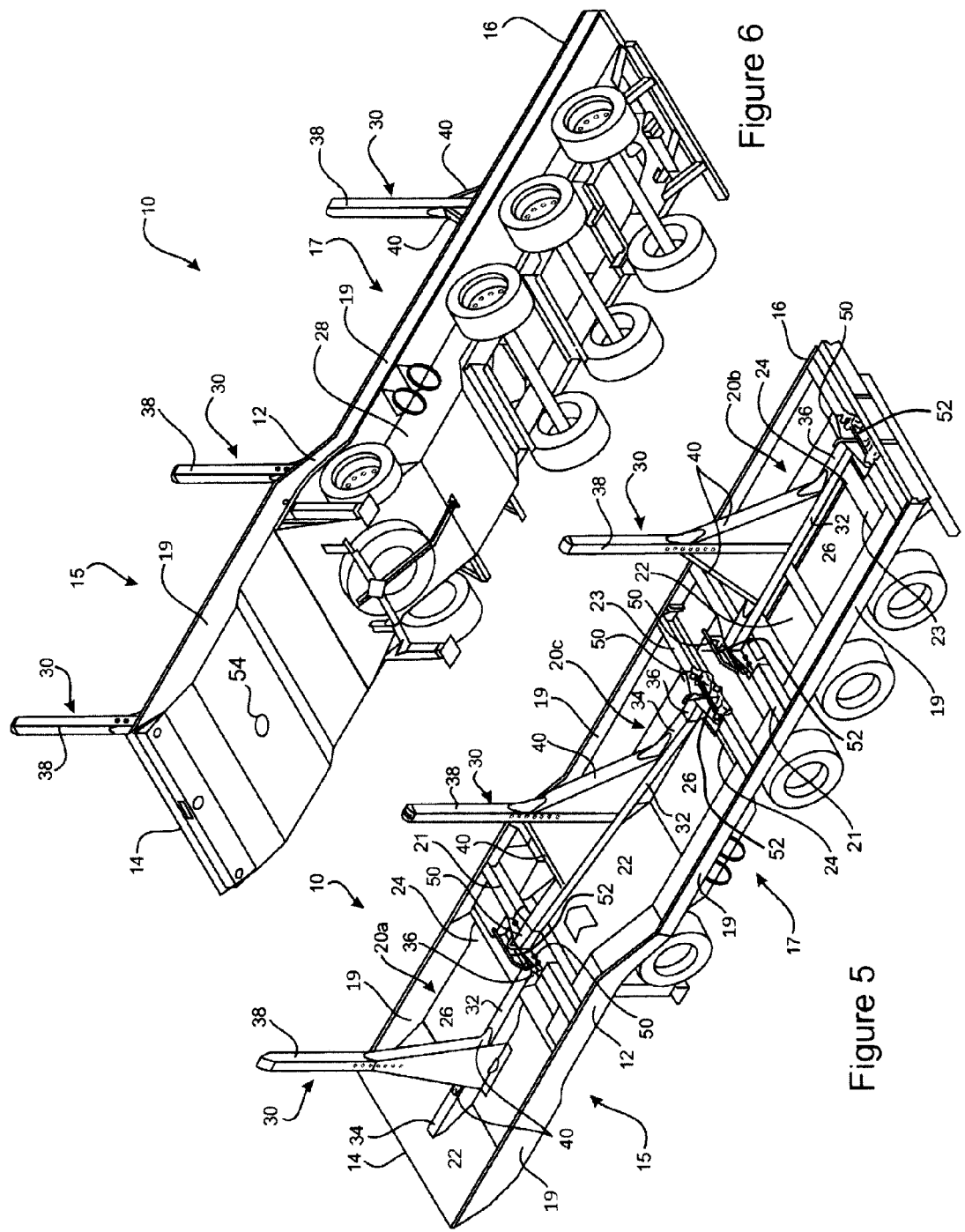

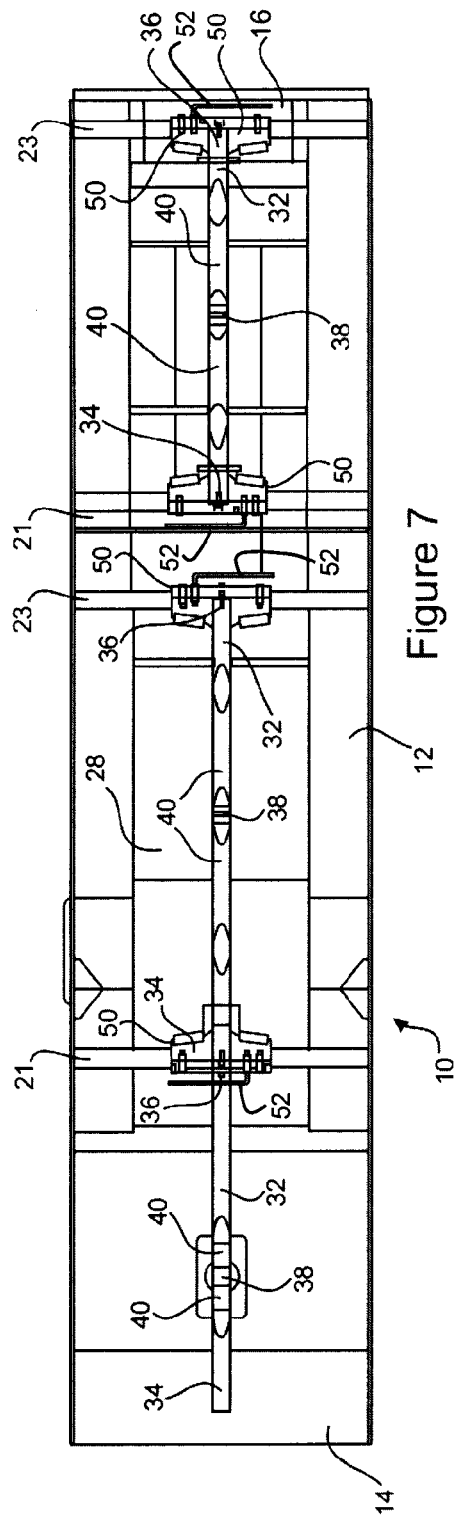
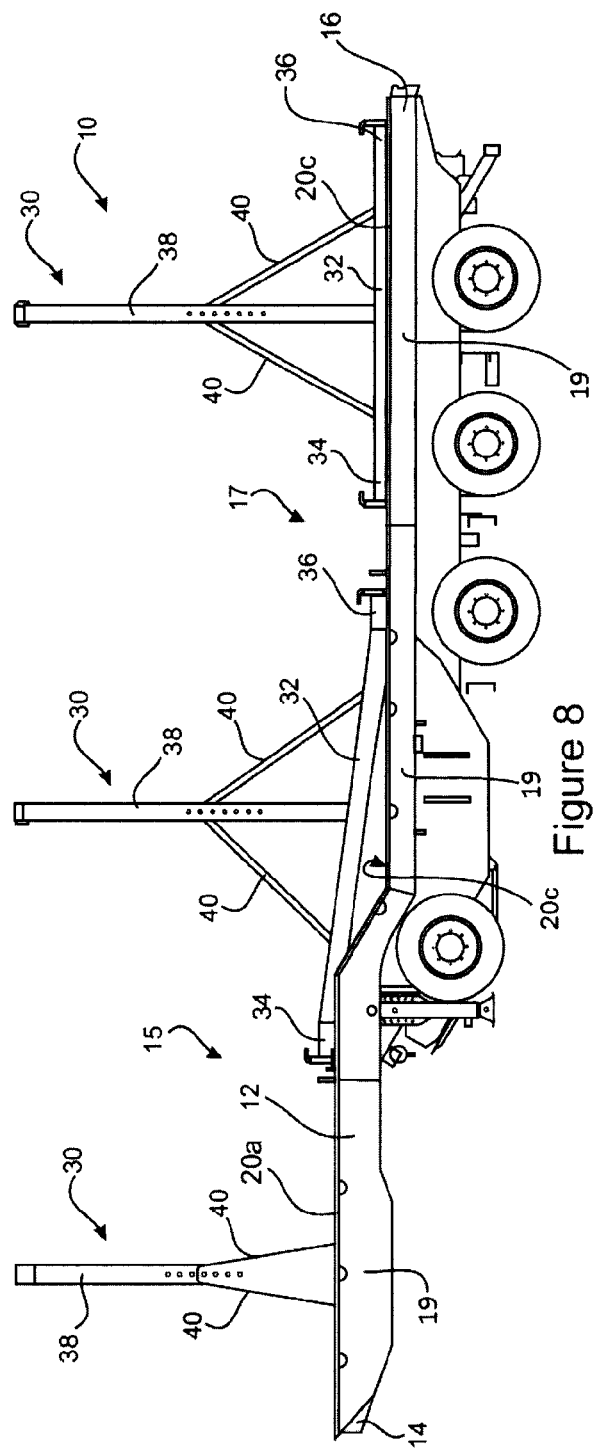
Figure 7
Figure 8

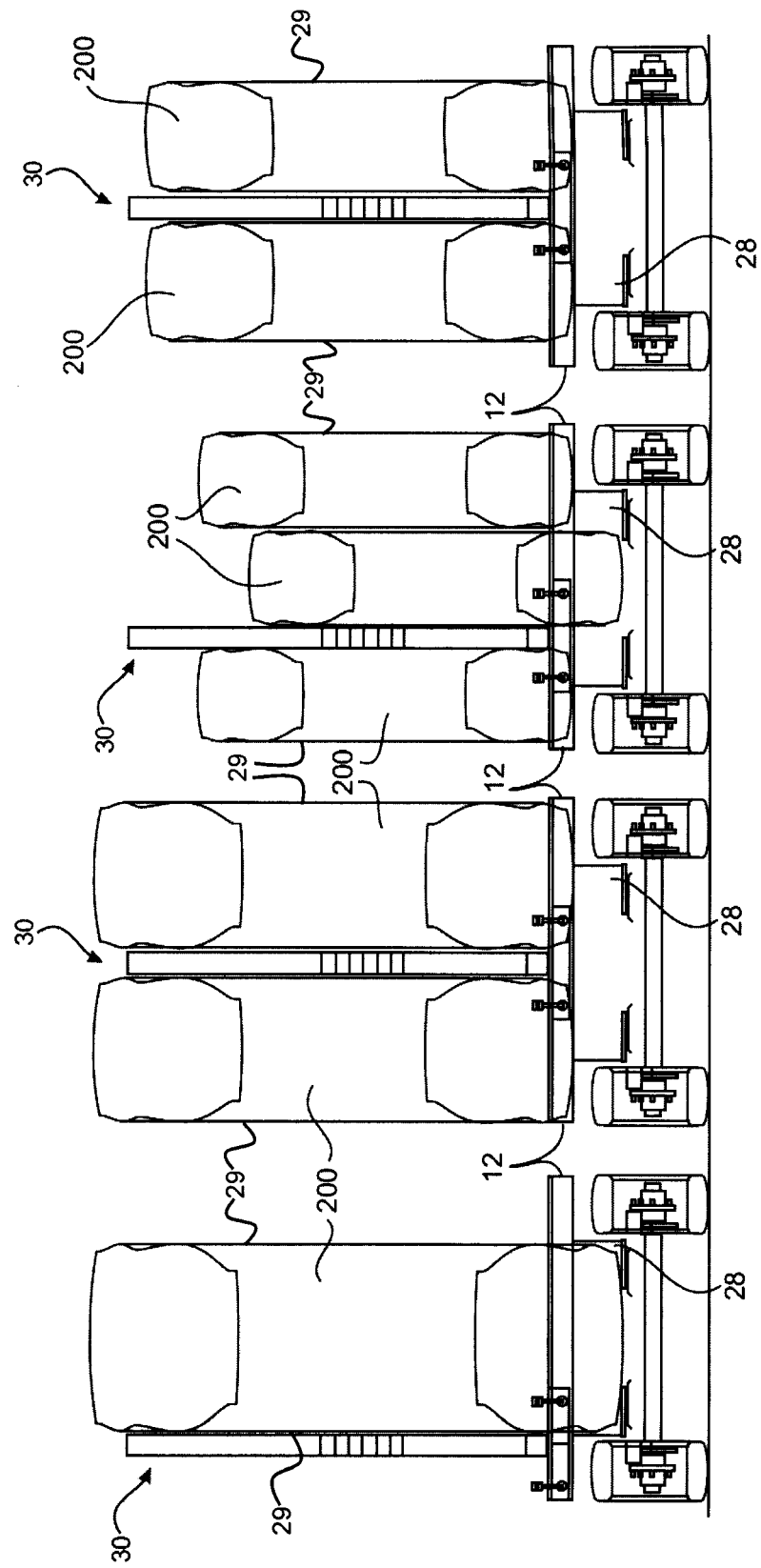

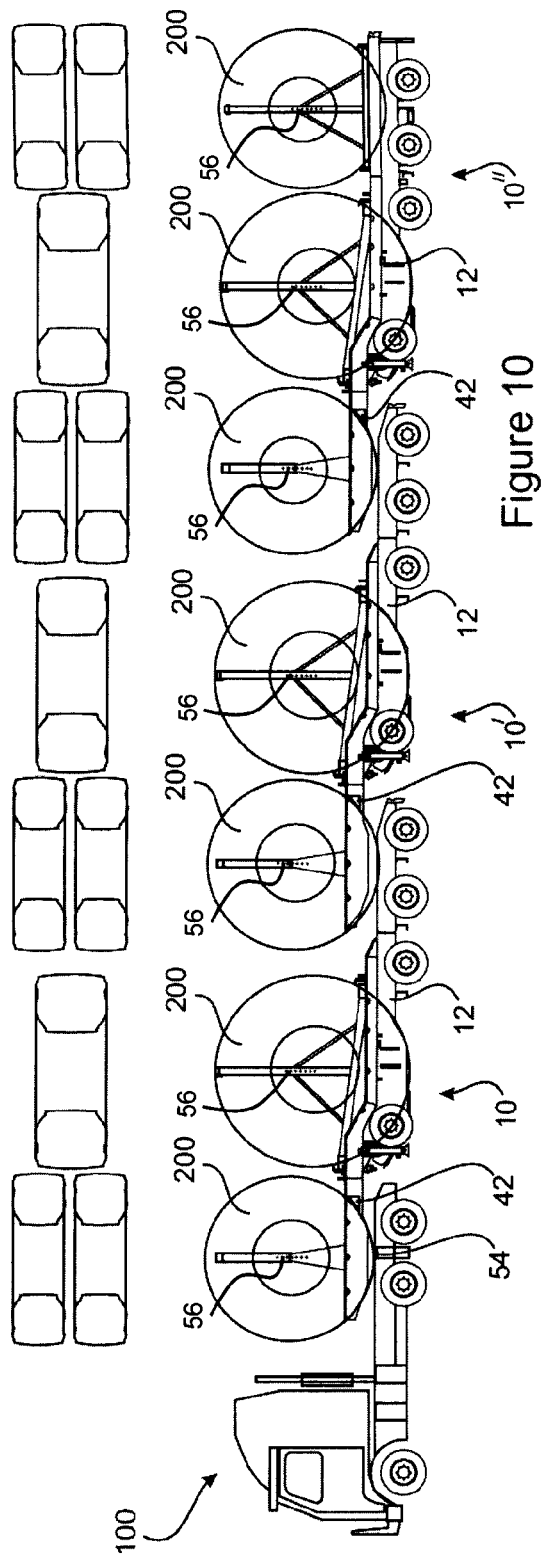
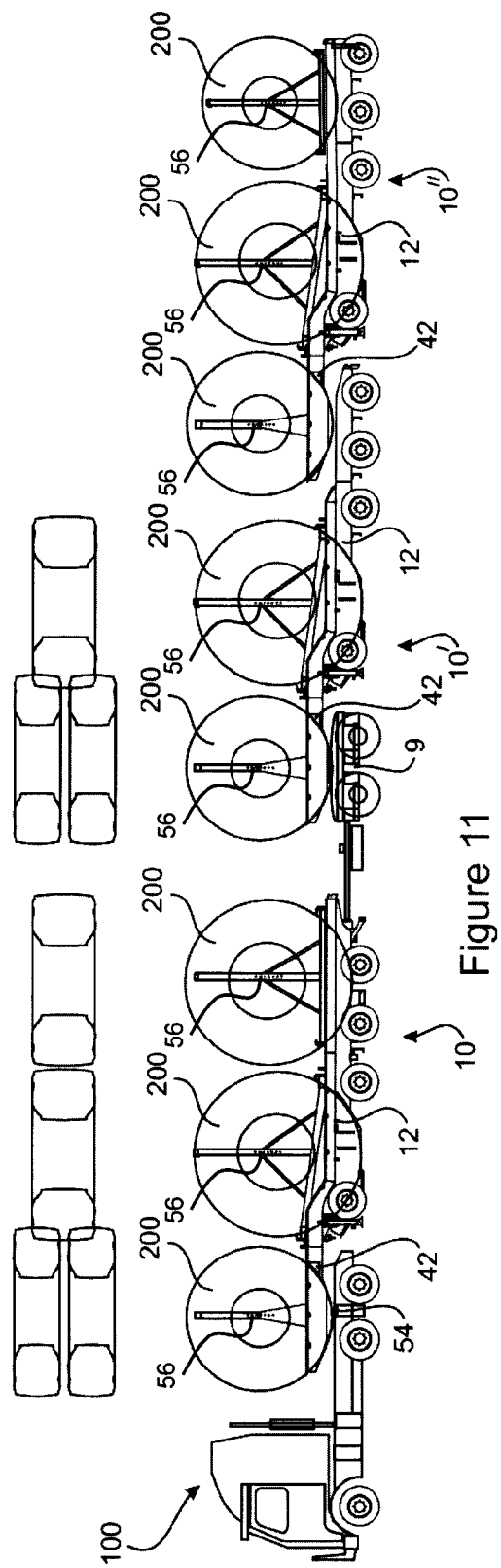

US 8,061,942 B2

TRAILER FOR HAULING TYRES

CROSS-REFERENCE TO RELATED APPLICATION

The present application claims the benefit under 35 U.S.C. §119 of Australian Application No. 2007904801, filed Sep. 4, 2007, the entire disclosure of which is incorporated by reference herein.

FIELD OF THE INVENTION

The present invention relates to a trailer. In particular, the present invention relates to a trailer for hauling tyres.

BACKGROUND OF THE INVENTION

Transportation of large numbers of tyres is typically achieved by stacking several recumbent tyres on top of one another and securely tethering the stacks to a platform of a flat bed truck or similar low platform trailer. Height and width restrictions on haulage vehicles, however, mean that special permits must be sought for transporting outsize tyres for use on heavy vehicles such as construction and mining vehicles, particularly in instances where the outer diameter dimension (ODD) of the tyre is greater than the width of the haulage vehicle, and the haulage vehicle must consequently be accompanied by an escort, thereby leading to increased overall transportation costs.

The present invention seeks to overcome at least some of the above mentioned disadvantages.

SUMMARY OF THE INVENTION

In its broadest aspect, the invention provides a trailer for hauling tyres.

Accordingly, in a first aspect the invention provides a trailer for hauling tyres comprising
 a base frame having a front end and a rear end, and one or more wells between the front end and the rear end configured to support the tyres in an upstanding position, each well having a tyre stillage against which one or more adjacent upstanding tyres are supported.

In one embodiment, the tyre stillage is positionable between opposing sides of the base frame to define adjacent subspaces in the well. In use, the subspaces are configured to receive one or more upstanding tyres to generally correspond to the width of the subspaces defined in the well.

In another embodiment, the tyre stillage comprises a first elongate member having a front end and a rear end in generally parallel alignment with the opposing sides of the base frame, a substantially vertical elongate member mounted on the first elongate member and a pair of brace members extending between the vertical elongate member and the first elongate member.

In one embodiment, the front and rear ends of the first elongate member are translatable between opposing sides of the base frame. In another embodiment, the front and rear ends of the first elongate member are slidably coupled to respective front and rear sides of the well. In another embodiment, the front and rear sides are provided with a front track and a rear track, respectively, which are configured to facilitate translation of the front and rear ends of the first elongate member thereon. In a further embodiment, the front and rear ends of the first elongate member are mounted on respective roller assemblies which are arranged to engage and travel along the front and rear tracks. The roller assemblies may be fixed in the desired position by fastening devices.

In a further embodiment of the invention, the trailer further comprises one or more tensioning members arranged in use to be inserted through a space defined by the upstanding transversely aligned tyres to facilitate lateral tensioning of said tyres against one another. Typically, the tensioning member bears against the tyre stillage, in particular, the vertical member of the tyre stillage.

In a yet further embodiment, the trailer further comprises a plurality of chocks which, in use, are positioned in an arrangement to brace tyres of different diameters in the well.

In another embodiment, the base frame includes lower and upper stepped tiers of wells. Typically, the upper stepped tier is proximal to the front end of the base frame.

Statutory road regulations place a limit on the vertical height of a hauled load, and thus hauling an upstanding tyre of outsize diameter may mean that the vertical height limit is exceeded. In a further embodiment, at least one well is provided with a recess configured to receive an outsize tyre. The well with the recess may be disposed in the lower stepped tier. In this way, the effective vertical height of the load is kept to a minimum.

In a further embodiment, the base frame has a coupling mechanism on its underside to facilitate coupling adjacent trailers in longitudinal alignment with one another. Suitable examples of such coupling mechanisms include, but are not limited to, a turntable, such as for example a ballraise or fixed turntable. It is convenient for the coupling mechanism to be disposed on an underside of the upper stepped tier so that the lower stepped tier of an adjacent trailer may be coupled thereto.

According to a second aspect of the present invention, there is provided a long combination vehicle for hauling tyres comprising two or more trailers as described above coupled in longitudinal alignment with one another and a tractor unit.

BRIEF DESCRIPTION OF THE DRAWINGS

Embodiments of the present invention will now be described, by way of example only, with reference to the accompanying drawings, in which:

FIG. 1 shows a perspective view of a trailer for hauling tyres according to one embodiment of the present invention, wherein two wells are provided for supporting tyres in an upstanding configuration;

FIG. 2 shows a view of the underside of the trailer shown in FIG. 1;

FIG. 3 shows a plan view of the trailer of FIGS. 1 and 2;

FIG. 4 shows a side view of the trailer of FIGS. 1, 2 and 3;

FIG. 5 shows a perspective view of a trailer for hauling tyres according to another embodiment of the present invention, wherein three wells are provided for supporting tyres in an upstanding configuration;

FIG. 6 shows a view of the underside of the trailer shown in FIG. 5;

FIG. 7 shows a plan view of the trailer of FIGS. 5 and 6;

FIG. 8 shows a side view of the trailer of FIGS. 5, 6 and 7;

FIG. 9a shows an end view of a trailer for hauling tyres as illustrated in FIGS. 1-8, in a first configuration wherein a single outsize tyre is shown as received in a recess of a well in a lower stepped tier of the trailer;

FIG. 9b shows an end view of a trailer for hauling tyres as illustrated in FIGS. 1-8, in a second configuration wherein two adjacent tyres are shown as received in a well in a lower stepped tier of the trailer;

FIG. 9c shows an end view of a trailer for hauling tyres as illustrated in FIGS. 1-8, in a third configuration wherein three adjacent tyres are shown as received in a well in a lower stepped tier of the trailer;

FIG. 9d shows an end view of a trailer for hauling tyres as illustrated in FIGS. 1-8, in an alternative configuration wherein two adjacent tyres of different widths to those illustrated in FIG. 9b are shown as received in a well in a lower stepped tier of the trailer;

FIG. 10 shows a side view of one embodiment of a long combination vehicle for hauling tyres in accordance with a second aspect of the present invention;

FIG. 11 shows a side view of another embodiment of a long combination vehicle of the present invention;

DETAILED DESCRIPTION OF EMBODIMENTS OF THE INVENTION

Referring to the Figures, where like numerals refer to like features throughout, a trailer 10 for hauling tyres 200, in particular for hauling tyres with an ODD of about 1 m to about 4 m, is shown. The trailer 10 is generally a low platform trailer which comprises a base frame 12 having a front end 14 and a rear end 16 and one or more wells 20 between the front and rear ends 14, 16 respectively and configured to support the tyres in an upstanding position. Each well comprises a tyre stillage 30 against which one or more adjacent upstanding tyres are supported. The base frame 12 is configured to define an upper stepped tier 15 proximal to the front end 14 and a lower stepped tier proximal 17 to the rear end 16.

It will be appreciated that an undercarriage of the trailer 10 is generally conventional in design and includes a plurality of wheel assemblies, supporting jacks, and suitable coupling assemblies for attachment to a haulage vehicle, such as for example a semi-trailer tractor unit, and so forth.

The rear end 16 of the trailer 10 may also be provided with a fixed dolly 18, configured to couple an adjacent trailer 10' in longitudinal alignment therewith. In an alternative arrangement, the rear end 16 of the trailer 10 may be provided with a coupling device (not shown) adapted to couple a detachable dolly 9 thereto, the detachable dolly 9 being arranged to couple the adjacent trailer 10' in longitudinal alignment therewith. The former and latter arrangements are associated with the embodiments shown in FIGS. 1-4 and FIGS. 5-8, respectively. In this way, it will be appreciated that a long combination vehicle 100 for hauling tyres could be configured comprising two or more trailers, in accordance with the embodiments of the present invention, coupled in longitudinal alignment with one another and a tractor unit, an example of which is shown in FIGS. 10 and 11.

The base frame 12 can also have a coupling mechanism 54 on its underside to facilitate coupling the fixed or detachable dolly of the adjacent trailer 10' in longitudinal alignment therewith to produce a long combination vehicle 100. Suitable examples of such coupling mechanisms 54 include but are not limited to a turntable, such as for example a ballraise or fixed turntable. It is convenient for the coupling mechanism 54 to be disposed on an underside of the upper stepped tier 15 so that the lower stepped tier 17 of an adjacent trailer 10' may be coupled thereto, as shown in FIG. 11.

The base frame 12 of the trailer 10 has one or more wells 20 between the front end 14 and the rear end 16 to support the tyres 100 in an upstanding configuration. One embodiment of the invention, shown in FIGS. 1-4, comprises a front well 20a and a rear well 20b proximal the front and rear ends 14, 16 respectively, whereas an alternative embodiment of the invention, shown in FIGS. 5-8, has, in addition to the front and rear wells 20a, 20b described above, an intermediate well 20c between the front and rear wells 20a, 20b. In both embodiments, the front well 20a is disposed in the upper stepped tier 15 of the trailer 10, while the rear and intermediate wells, 20b, 20c are disposed in the lower stepped tier 17 of the trailer 10.

The well 20 comprises a generally U-shaped depression having front and rear sides 22, 24 inwardly tapering towards a generally horizontal lower surface 26, extending between opposing side walls 19 of the base frame 12. The shape of the well 20 is configured to receive one or more upstanding tyres 200 where a circumferential surface of the tyre 200 is supported by one or more of the front, rear sides 22, 24 and the lower surface 26, and side walls 29 of the tyres 200 are in general parallel alignment with the opposing side walls 19 of the base frame 12.

In some cases where the tyre 200 has a narrow diameter, its circumferential surface may only be supported by the lower surface 26 of the well 20. In order to provide improved support to the tyre 200 in the well 20, the trailer 10 may further comprise a plurality of chocks 42 which, in use, are wedged between the circumferential surface of the tyre 200 and the front and rear sides 22, 24 to brace the tyre 200 in the well 20.

In other cases where the tyre 200 has a broad diameter, its circumferential surface may only be supported by the front and rear sides 22, 24 of the well 20, and the tyre 200 may not be supported by the lower surface 26 of the well 20 at all.

Where the broad diameter tyre 200 sits too high in the well 20 it may exceed a vertical height limit prescribed by statutory road regulations. Accordingly, in a preferred embodiment of the invention, at least one well 20 in the trailer 10 is provided with a recess 28 configured to receive an outsize tyre 100. Preferably the recess 28 is disposed in the rear well 20b or the intermediate well 20c in the lower stepped tier 17 of the trailer 10. In this way, the effective vertical height of the load is kept to a minimum.

Typically the recess 28 does not extend across the entire width of the trailer 10 between the opposing side walls 19, but rather extends in a space defined between the wheel assemblies supporting the trailer 10, as shown in FIGS. 9a-9d. It will be appreciated that if the tyre 200 that is received in the recess 28 has a narrower width than the recess 28, then the tyre 200 may be laterally stabilised in the recess 28 by inserting wedges or such like between respective side walls of the tyre 200 and side walls of the recess 28.

Each well 20a, 20b, 20c is provided with a tyre stillage 30 against which one or more adjacent upstanding tyres 200 is supported in a close facing arrangement.

As demonstrated in FIGS. 9a-9d, the tyre stillage is positionable between opposing side walls 19 of the base frame 12 to define subspaces of different widths in the well 20. In use, the subspaces are configured to receive one or more upstanding tyres to generally correspond to the width of the subspaces defined in the well.

FIG. 9a, for example, shows an outsize tyre 200, such as for example a 59/80R63 tyre of about 4.03 m diameter, received in the recess 28 of the well 20b with the tyre stillage 30 positioned to one side of the outsize tyre to define a narrow subspace and broader subspace in which to accommodate the outsize tyre 200.

In FIGS. 9b and 9d, the tyre stillage 30 is positioned equidistantly from opposing side walls 19 of the base frame 12 to define two similarly sized subspaces, each subspace being arranged to receive a single tyre. As contrasted between FIGS. 9b and 9d, the width and diameter of the tyres may vary, for example between a 40.00057 tyre and a 33.00R51 tyre, and it will be appreciated that when the width of adjacent tyres is narrower than the width of the well 20, then wedges or other tensioning or bracing devices may be utilized to laterally stabilize the tyres in the well 20.

The tyre stillage 30 in FIG. 9c is positioned to define a first subspace to receive one tyre, and a second subspace to receive two adjacent tyres, with one of the two adjacent tyres sitting in the recess 28 of the well.

In comparing the arrangements in FIGS. 9a and 9b it will be appreciated that although the tyre shown in FIG. 9a has a larger diameter than the tyres shown in FIG. 9b, the effective load height of the trailer 10 in FIGS. 9a and 9b is generally the same because the larger diameter tyre shown in FIG. 9a is received in the recess 28 of the well 20b.

The tyre stillage 30 comprises a first elongate member 32 having a front end 34 and a rear end 36 in generally parallel alignment with the opposing sides 19 of the base frame 12, a substantially vertical elongate member 38 mounted on the first elongate member 32 generally equidistantly between the front and rear ends 34, 36 thereof, and a pair of brace members 40 extending between the vertical elongate member 38 and the first elongate member 32. While it is not essential that the effective height of the vertical elongate member 38 exceeds the effective height of the load in the trailer 10, it is preferable that the vertical elongate member 38 is of sufficient length for at least a portion of the upper side of the tyre 200 to bear against it in use.

The front and rear ends 34, 36 of the first elongate member 32 are slidably coupled to respective front and rear sides 22, 24 of the well 20. As will be seen from the Figures, the first elongate member 32 is spaced apart from the lower horizontal surface 26 of the well 20 and is not in parallel alignment therewith where the front and rear sides 22, 24 are at different elevations. In particular, the front and rear sides 22, 24 are at different elevations where the rear sides 24 of the rear or intermediate wells 20b, 20c define a transition from the lower stepped tier 17 to the upper stepped tier 15 in the base frame 12 of the trailer 10.

In the embodiment shown in the Figures, the front and rear sides 22, 24 are provided with a front track 21 and a rear track 23, respectively, which are configured to facilitate translation of the front and rear ends 34, 36 of the first elongate member 32 thereon. Preferably, the front and rear ends 34, 36 of the first elongate member 32 are mounted on respective roller assemblies 50, which are arranged to engage with and travel along the front and rear tracks 21, 23. The roller assemblies 50 can be fixed in a desired position on the front and rear tracks 21 and 23 by fastening devices 52 to facilitate desired positioning of the tyre stillage 30 in the well 20.

The trailer 10 further comprises one or more tensioning members 56 arranged in use to be inserted through a space defined by the upstanding transversely aligned tyres 200 to facilitate lateral tensioning of said tyres against one another. Typically, the tensioning members 56 bear against the vertical elongate member 38 of the tyre stillage 30. Illustrative examples of tensioning members 56 include a rio bar which, in use, is threaded through the centre void of the tyres 200 and is positioned to engage with the vertical elongate member 38 of the tyre stillage 30. Typically, the rio bar 56 is placed above a central axis of the tyre 200, extending through an appropriately located aperture in the vertical elongate member 38 of the tyre stillage 30.

Alternatively respective ends of the rio bar are engaged with cross bracing members which are fitted into the internal diameter of the tyres and the rio bar is tightened against the cross bracing members to laterally tension the tyres against the tyre stillage 30.

The trailer 10 of the present invention can be loaded by first adjusting the position of the tyre stillage 30 to an appropriate position in its respective well 20 to define one or more subspaces having a width generally corresponding to the width of the tyre to be loaded. The tyre is then placed in the subspace in the well 20 on its circumferential surface with tyre side walls in parallel alignment with the opposing side walls of the trailer 10 in a close facing arrangement with the tyre stillage 30. The one or more tyres received in the well 20 are then laterally tensioned by inserting a rio bar into the void defined by the tyre(s) and engaging the end of the rio bar with the vertical member 38 of the tyre stillage 30. Alternatively or additionally, a cross brace member can be fitted in the internal diameter of the tyre(s) and engaged with the respective ends of the rio bar. The rio bar is then subsequently tightened to laterally tension the tyres against one another and the tyre stillage 30.

The materials of construction of the trailer 10 described can be any suitable materials which wear appropriately, and that can be shaped, formed and fitted in the manner so described, and include an appropriate metal such as mild steel, metal alloys, and so on.

In the description of the invention, except where the context requires otherwise due to express language or necessary implication, the words "comprise" or variations such as "comprises" or "comprising" are used in an inclusive sense, i.e. to specify the presence of the stated features, but not to preclude the presence or addition of further features in various embodiments of the invention.

It is to be understood that, although prior art use and publications may be referred to herein, such reference does not constitute an admission that any of these form a part of the common general knowledge in the art, in Australia or any other country.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

The invention claimed is:

1. A trailer for hauling tyres comprising:
   a base frame having a front end, a rear end, and opposing sides with one or more wells disposed therebetween, each well being configured to support one or more tyres in an upstanding position, each tyre having a side wall in generally parallel alignment with the opposing sides of the base frame;
   a tyre stillage against which the one or more upstanding tyres are supported, the tyre stillage being translatable between the opposing sides of the base frame to define adjacent subspaces in the one or more wells in which the one or more tyres are received,
   wherein the tyre stillage comprises:
   a first elongate member having a front end and a rear end that is in generally parallel alignment with the opposing sides of the base frame;
   a substantially vertical elongate member mounted between the front and rear end of the first elongate member; and
   a pair of brace members extending between the vertical elongate member and the first elongate member.

2. The trailer of claim 1, wherein each subspace is configured to receive at least one of the one or more upstanding tyres that has a width, or that have combined widths, that correspond to a width of the subspace in which the at least one of the one or more upstanding tyres is received.

3. The trailer of claim 1, wherein the front and rear ends of the base frame are provided with a front track and a rear track, respectively, to which the front and rear ends of the first elongate member are coupled, respectively.

4. The trailer of claim 3, wherein the front and rear ends of the first elongate member are slidably coupled to the front and rear tracks to facilitate repositioning the tyre stillage between the opposing sides of the base frame.

5. The trailer of claim 4, wherein the front and rear ends of the first elongate member are slidably coupled to the front and rear tracks with roller assemblies that are arranged to engage with and travel along the front and rear tracks.

6. The trailer of claim 5, wherein the roller assemblies can be fixed in a desired position on the front and rear tracks by fastening devices.

7. The trailer of claim 1, further comprising one or more tensioning members arranged in use to be inserted through a space defined by the one or more upstanding tyres that are supported in one of the one or more wells when those upstanding tires are transversely aligned to facilitate lateral tensioning of those upstanding tyres against the tyre stillage.

8. The trailer of claim 1, further comprising one or more chock that is positioned to brace at least one of the one or more upstanding tyres that is being supported in one of the one or more wells when that at least one upstanding tyre is of a different diameter than a distance between a front side and a rear side of the one well.

9. The trailer of claim 1, wherein the one or more wells include:
a first well in an upper stepped tier of the base frame; and
at least a second well in a lower stepped tier of the base frame.

10. The trailer of claim 9, wherein the upper stepped tier is proximal to the front end of the base frame.

11. The trailer of claim 1, wherein at least one of the one or more wells is provided with a recess configured to receive at least one of the one or more upstanding tyres that is an outsize tyre.

12. The trailer of claim 11, wherein
the one or more wells include
a first well in an upper stepped tier of the base frame, and
at least a second well in a lower stepped tier of the base frame; and
the at least second well is the at least one of the one or more wells that is provided with the recess.

13. The trailer of claim 1, wherein the base frame has a coupling mechanism on an underside thereof to facilitate coupling adjacent trailers in longitudinal alignment with one another.

14. A long combination vehicle for hauling tyres comprising:
two or more trailers for hauling tyres as defined in claim 1 coupled in longitudinal alignment with one another; and
a tractor unit.

* * * * *